(12) United States Patent
Kamito et al.

(10) Patent No.: US 10,407,331 B2
(45) Date of Patent: Sep. 10, 2019

(54) SCALE DETECTION DEVICE AND METHOD FOR CONCENTRATING DEVICE, AND WATER RECLAMATION PROCESSING TREATMENT SYSTEM

(71) Applicant: MITSUBISHI HEAVY INDUSTRIES, LTD., Tokyo (JP)

(72) Inventors: Ryo Kamito, Tokyo (JP); Susumu Okino, Tokyo (JP); Masayuki Eda, Tokyo (JP); Hideaki Sakurai, Tokyo (JP); Nobuyuki Ukai, Tokyo (JP); Hideo Suzuki, Tokyo (JP); Hiroshi Nakashoji, Tokyo (JP); Shigeru Yoshioka, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 504 days.

(21) Appl. No.: 14/913,498

(22) PCT Filed: Dec. 8, 2014

(86) PCT No.: PCT/JP2014/082440
§ 371 (c)(1),
(2) Date: Feb. 22, 2016

(87) PCT Pub. No.: WO2015/093336
PCT Pub. Date: Jun. 25, 2015

(65) Prior Publication Data
US 2016/0207811 A1 Jul. 21, 2016

(30) Foreign Application Priority Data
Dec. 18, 2013 (JP) .................................. 2013-261653

(51) Int. Cl.
*C02F 5/00* (2006.01)
*B01D 61/10* (2006.01)
(Continued)

(52) U.S. Cl.
CPC .............. *C02F 5/00* (2013.01); *B01D 61/022* (2013.01); *B01D 61/025* (2013.01); *B01D 61/10* (2013.01);
(Continued)

(58) Field of Classification Search
None
See application file for complete search history.

(56) References Cited

U.S. PATENT DOCUMENTS

2010/0051559 A1 3/2010 Musale
2010/0126935 A1 5/2010 Echizen et al.
(Continued)

FOREIGN PATENT DOCUMENTS

CN 101646482 A 2/2010
CN 102459096 A 5/2012
(Continued)

OTHER PUBLICATIONS

Van De Lisdonk, C.A.C. et al, "Monitoring Scaling in Nanofiltration and Reverse Osmosis Membrane Systems", Desalination, Oct. 2000, vol. 132, pp. 101-108. (7 pages).
(Continued)

*Primary Examiner* — Vishal V Vasisth
(74) *Attorney, Agent, or Firm* — Westerman, Hattori, Daniels & Adrian, LLP

(57) ABSTRACT

A scale detection device of a concentrating device comprises: a reverse osmosis membrane device 13 that is a concentrating device including a reverse osmosis membrane 13a, which is a filtering membrane for concentrating salt in a water to be treated 11, containing at least calcium sulfate
(Continued)

to obtain reclaimed water 12; and a scale detection unit 15 disposed in a branched line $L_{14}$ branched from a concentrated water line $L_{13}$ discharging concentrated water 14 having a high concentration of salt, the scale detection unit further concentrating the salt in the concentrated water 14 to obtain reclaimed water for detection 16, and including a detection membrane 15a detecting the absence or presence of scale component deposition in the concentrated water 14.

24 Claims, 11 Drawing Sheets

(51) Int. Cl.
| | | |
|---|---|---|
| *C02F 1/44* | (2006.01) | |
| *B01D 61/02* | (2006.01) | |
| *B01D 61/12* | (2006.01) | |
| *C02F 1/66* | (2006.01) | |
| *C02F 1/00* | (2006.01) | |
| *B01D 61/04* | (2006.01) | |
| *C02F 101/10* | (2006.01) | |

(52) U.S. Cl.
CPC ............ *B01D 61/12* (2013.01); *C02F 1/441* (2013.01); *C02F 1/66* (2013.01); *B01D 61/04* (2013.01); *B01D 2311/04* (2013.01); *B01D 2311/08* (2013.01); *B01D 2311/12* (2013.01); *B01D 2311/18* (2013.01); *B01D 2311/246* (2013.01); *C02F 1/008* (2013.01); *C02F 2101/101* (2013.01); *C02F 2301/046* (2013.01)

(56) References Cited

U.S. PATENT DOCUMENTS

| | | |
|---|---|---|
| 2011/0303606 A1 | 12/2011 | Takeuchi et al. |
| 2012/0031844 A1 | 2/2012 | St. Hilaire |
| 2015/0121867 A1 | 5/2015 | Kubota et al. |

FOREIGN PATENT DOCUMENTS

| | | |
|---|---|---|
| CN | 102652258 A | 8/2012 |
| JP | 52-89576 A | 7/1977 |
| JP | 9-206749 A | 8/1997 |
| JP | 10-85742 A | 4/1998 |
| JP | 10-113660 A | 5/1998 |
| JP | 2001-120966 A | 5/2001 |
| JP | 2009-524521 A | 7/2009 |
| JP | 2010-274202 A | 12/2010 |
| WO | 02/28517 A1 | 4/2002 |
| WO | 2007/087578 A2 | 8/2007 |
| WO | 2008/126777 A1 | 10/2008 |
| WO | 2010/143623 A1 | 12/2010 |
| WO | 2011/163278 A2 | 12/2011 |
| WO | 2012/081746 A1 | 6/2012 |

OTHER PUBLICATIONS

Van De Lisdonk, C.A.C. et al, "Prediction of Supersaturation and Monitoring of Scaling in Reverse Osmosis and Nanofiltration Membrane Systems", Desalination, Sep. 2001, vol. 138, pp. 259-270. (12 pages).

Gabelich, C.J. et al, "High-recovery Reverse Osmosis Desalination Using Intermediate Chemical Demineralization", Journal of Membrane Science, Aug. 2007, vol. 301, pp. 131-141. (11 pages).

Partial supplementary European Search Report dated Aug. 3, 2016, issued in counterpart European Patent Application No. 14871742.4. (8 pages).

International Search Report dated Feb. 10, 2015, issued in counterpart application No. PCT/JP2014/082440 (5 pages).

Written Opinion dated Feb. 10, 2015, issued in counterpart application No. PCT/JP2014/082440 (6 pages).

Office Action dated Feb. 16, 2017, issued in counterpart Chinese Application No. 201480041630.1, with English translation. (19 pages).

Office Action dated Aug. 18, 2016, issued in counterpart Chinese Patent Application No. 201480041630.1, with English translation. (20 pages).

"How Reverse Osmosis Booster Pumps Work", Pure Water Gazzette How It Works Series, Mar. 12, 2011, retrieved fom the Internet; cited in European Office Action dated Jan. 19, 2018. (2 pages).

Office Action dated Jan. 19, 2018, issued in counterpart European Application No. 14871742.4. (7 pages).

SCALE DETECTION DEVICE AND METHOD FOR CONCENTRATING DEVICE, AND WATER RECLAMATION PROCESSING TREATMENT SYSTEM

This application is a 371 of PCT/JP2014/082440, filed Dec. 8, 2014.

TECHNICAL FIELD

The present invention relates to a scale detection device and a method for a concentrating device, and a water reclamation treatment system.

BACKGROUND ART

Mine wastewater, for example, contains pyrite ($FeS_2$), which oxidizes to produce $SO_4^{2-}$. In order to neutralize the mine wastewater, $Ca(OH)_2$, which is low-cost, is used. Therefore, the mine wastewater contains $Ca^{2+}$ and $SO_4^{2-}$ in abundance.

It is known that saline water, sewage and industrial waste water also contain $Ca^{2+}$ and $SO_4^{2-}$ in abundance. In a cooling tower, heat exchange is performed between cooling water and high-temperature exhaust gas discharged from a boiler. A portion of the cooling water becomes steam due to this heat exchange, so the ions in the cooling water are concentrated. Accordingly, the cooling water discharged from the cooling tower (blowdown water) contains high concentrations of ions such as $Ca^{2+}$ and $SO_4^{2-}$.

The water containing large quantities of ions is typically released into the environment after being desalinated. Known examples of concentrating device for performing desalination treatment include a reverse osmosis membrane device, a nanofiltration membrane device, and an ion exchange membrane device.

However, in the desalination treatment using these devices, if cations (e.g. calcium ions ($Ca^{2+}$)) and anions (e.g. sulfate ions, ($SO_4^{2-}$)) at high concentrations are concentrated on a membrane upon recovering reclaimed water thereof, the concentrations may exceed the solubility limit of calcium sulfate (gypsum ($CaSO_4$)), which is a poorly soluble mineral salt. This may become problematic, because deposition may be formed on the membrane surface as scales, causing the reduction in permeation flux (flux) of reclaimed water.

Therefore, monitoring methods for mineral salt crystalline formation have been proposed in the conventional art, such as a method in which a cell monitoring the reverse osmosis membrane in the reverse osmosis membrane device was used to monitor the reverse osmosis membrane and the formation of the mineral salt crystals was visually observed (Patent Document 1).

CITATION LIST

Patent Literature

Patent Document 1: Japanese Unexamined Patent Application Publication No. 2009-524521A

SUMMARY OF INVENTION

Technical Problem

However, the monitoring method in the Patent Document 1 includes detecting the deposition of mineral salt crystals on the monitoring cell and monitoring using the monitoring cell and may fail to detect signs of crystal deposition in advance since the deposition of mineral salt crystal is also occurring on the reverse osmosis membrane.

Thus, a scale monitoring device is desired, which is able to detect crystal deposition on a reverse osmosis membrane of a reverse osmosis membrane device in advance, upon water treatment of water to be treated using the reverse osmosis device.

In view of the problem described above, the present invention aims to provide a scale detection device and method, which are able to detect crystal deposition on a filtering membrane of a concentrating device in advance, and a water reclamation treatment system.

Solution to Problem

To solve the problems described above, the first invention of the present invention relates to a scale detection device of a concentrating device comprising: a concentrating device including a filtering membrane, concentrating salt in a water to be treated containing at least calcium sulfate to obtain reclaimed water; and a scale detection device disposed in a branched line branched from a concentrated water line discharging concentrated water having a high concentration of salt, the scale detection unit further concentrating salt in the concentrated water to obtain reclaimed water for detection, and including a detection membrane detecting the absence or presence of scale component deposition in the concentrated water.

The second invention relates to the scale detection device of the concentrating device according to the first invention, which comprises a booster pump to increase a pressure of the concentrated water supplied to the detection membrane in the scale detection unit.

The third invention relates to the scale detection device of the concentrating device according to the first or the second invention, which comprises a valve that reduces an amount of the concentrated water for detection separated at the detection membrane.

The fourth invention relates to the scale detection device of the concentrating device according to the third invention, which comprises a circulation line that feeds the concentrated water for detection separated at the detection membrane back to an inlet of the detection membrane.

The fifth invention relates to the scale detection device of the concentrating device according to any one of the first to the fourth inventions, which comprises a heat exchange device that performs heat exchange on the concentrated water supplied to the scale detection unit.

The sixth invention relates to the scale detection device of the concentrating device according to any one of the first to the fifth inventions, in which an effect of a scale inhibitor is canceled out by supplying an acid to the concentrated water exiting from the concentrating device, when scale deposition on the filtering membrane of the concentrating device is prevented by supplying the scale inhibitor to the water to be treated before introduction to the concentrating device.

The seventh invention relates to the scale detection device of the concentrating device according to any one of the first to the sixth inventions, in which the scale component is calcium sulfate and the detection membrane is a reverse osmosis membrane.

The eighth invention relates to the scale detection device of the concentrating device according to any one of the first to the seventh inventions, in which the water to be treated is any one of mine wastewater, blowdown water of a power plant cooling tower, produced water during drilling of oil or gas, saline water, and industrial waste water.

The ninth invention of the present invention is a scale detection method of the concentrating device, which comprises a salt concentrating step of concentrating salt in water to be treated containing at least calcium sulfate by a filtering membrane, and separating the water to be treated into reclaimed water and concentrated water; and a scale detection step of obtaining reclaimed water for detection by further concentrating salt in a portion of separated and salt-concentrated water, and detecting the absence or presence of scale component deposition in the concentrated water.

The tenth invention relates to the scale detection method of the concentrating device according to the ninth invention, in which a pressure of the concentrated water supplied to a detection membrane in the scale detection step is increased to improve a concentration ratio.

The eleventh invention relates to the scale detection method of the concentrating device according to the ninth or the tenth invention, in which an amount of concentrated water for detection separated at the detection membrane is reduced to improve the concentration ratio.

The twelfth invention relates to the scale detection method of the concentrating device according to any one of the ninth to eleventh inventions, in which the concentrated water for detection separated at the detection membrane is sent back to an inlet of the detection membrane to improve the concentration ratio.

The thirteenth invention relates to the scale detection device of the concentrating device according to any one of the ninth to the twelfth inventions, in which the concentrated water supplied to the scale detection unit is subjected to heat exchange to increase the amount of the scale deposition.

The fourteenth invention relates to the scale detection device of the concentrating device according to any one of the ninth to the thirteenth inventions, in which an effect of a scale inhibitor is canceled out by supplying an acid to the concentrated water exiting from the concentrating device, when scale deposition on the filtering membrane of the concentrating device is prevented by supplying the scale inhibitor to the water to be treated before introduction to the concentrating device.

A fifteenth invention of the present invention is a water reclamation treatment system comprising: a first scale inhibitor-supplying unit supplying a scale inhibitor to water to be treated containing a calcium sulfate component; a first pH-adjusting unit adjusting a pH of discharged water to which the scale inhibitor has been supplied using a pH-adjusting agent; a first concentrating device provided downstream of the first pH-adjusting unit, the first concentrating device concentrating salt in the water to be treated and separating the water to be treated into first reclaimed water and first concentrated water; a crystallizing tank provided downstream of the first concentrating device, the crystallizing tank crystallizing calcium sulfate from the first concentrated water; a first scale detection unit provided in a first branch line branched from a first concentrated water line discharging the first concentrated water with salt therein concentrated at the first concentrating device, the first scale detection unit obtaining a first reclaimed water for detection by further concentrating salt from the first concentrated water and including a first detecting membrane detecting the absence or presence of scale component deposition in the concentrated water.

A sixteenth invention of the present invention is a water reclamation treatment system according to the fifteenth invention, further comprising: a second scale inhibitor-supplying unit supplying a scale inhibitor to the first concentrated water, calcium sulfate having been separated from the first concentrated water; a second pH-adjusting unit adjusting a pH of the first concentrated water, the scale inhibitor having been supplied to the first concentrated water; a second concentrating device provided downstream of the second pH-adjusting unit, the second concentrating device concentrating salt in the first concentrated water and separating the first concentrated water into second reclaimed water and second concentrated water; and a second scale detection unit provided in a second branch line branched from a second concentrated water line discharging the second concentrated water with salt therein concentrated at the second concentrating device, the second scale detection unit obtaining a second reclaimed water for detection by further concentrating salt from the second concentrated water and including a second detecting membrane detecting the absence or presence of scale component deposition in the second concentrated water.

Advantageous Effects of Invention

According to the present invention, by having a scale detection unit, crystal deposition on the filtering membrane in the concentrating device is detected in advance, when the water to be treated is treated using the concentrating device.

DESCRIPTION OF EMBODIMENTS

The following is a detailed description of preferred embodiments of the present invention with reference to the attached drawings. Note that the present invention is not limited by the embodiments, and when a plurality of embodiments are present, the invention is intended to include a configuration combining these embodiments.

Example 1

Figure 1:
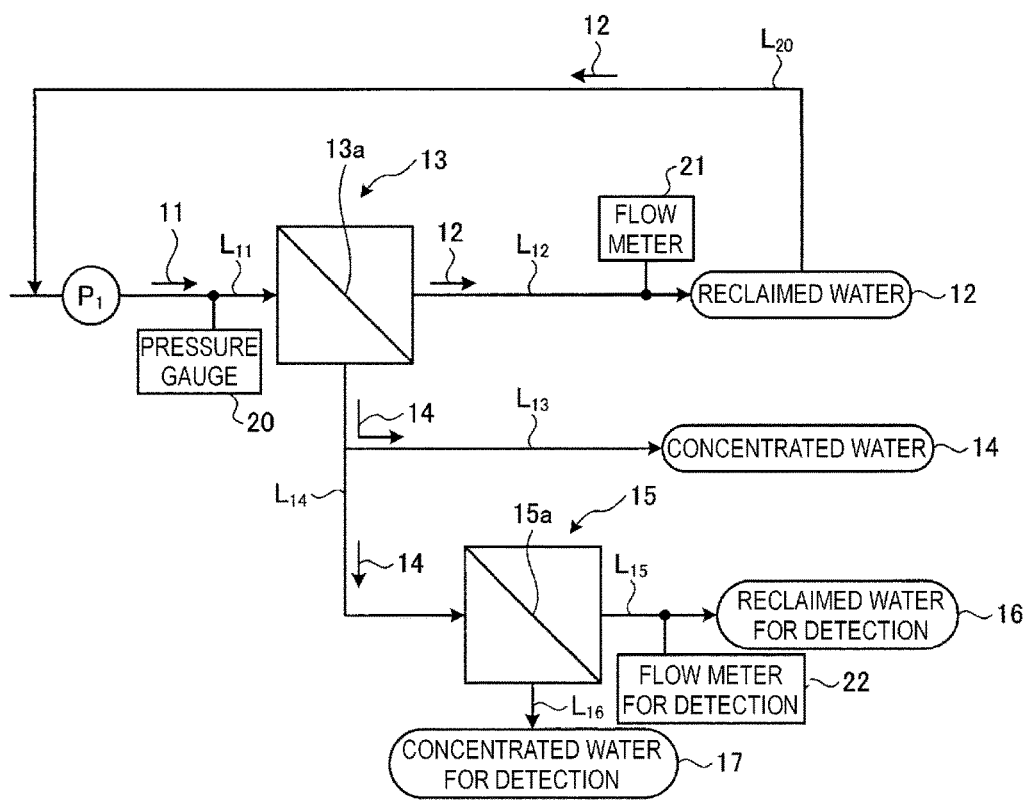
FIG. 1 is a schematic diagram of a scale detection device of a concentrating device according to Embodiment 1.

FIG. 1 is a schematic diagram of a scale detection device of a concentrating device according to Embodiment 1. FIG.

Figure 3:
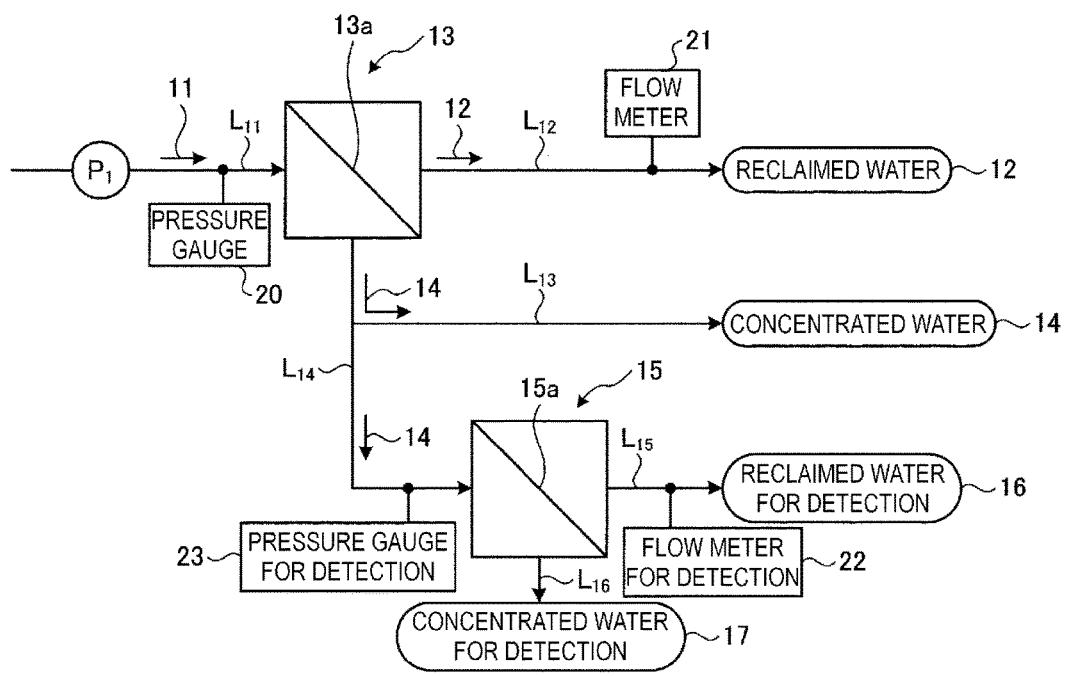
FIG. 3 is a schematic diagram of a scale detection device of another concentrating device according to Embodiment 1.
Figure 4:
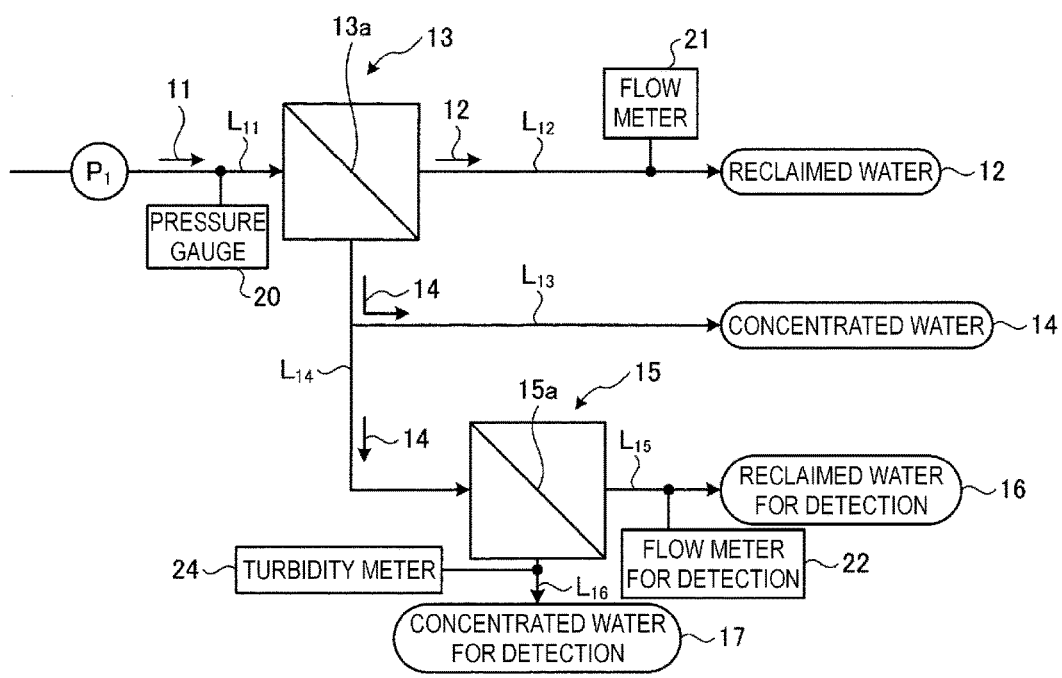
FIG. 4 is a schematic diagram of a scale detection device of another concentrating device according to Embodiment 1.

2 is a graph illustrating the relationship between the time of water treatment operation (horizontal axis), the amount of scale deposition on the filtering membrane (left vertical axis) and the permeation flux (right vertical axis). FIG. 3 and FIG. 4 are schematic diagrams of scale detection devices of other concentrating devices according to Embodiment 1.

As illustrated in FIG. 1, the scale detection device of a concentrating device according to the present embodiment includes: a reverse osmosis membrane device 13 that is a concentrating device including a reverse osmosis membrane 13a, which is a filtering membrane for concentrating salts from water to be treated 11 containing at least calcium sulfate, and obtaining reclaimed water 12; and a scale detection unit 15 disposed in a branch line $L_{14}$ branching from a concentrated water line $L_{13}$ that discharges concentrated water 14 having a high concentration of salts, the scale detection unit 15 including a detection membrane 15a for further concentrating the salt from the concentrated water 14 and obtaining reclaimed water for detection 16 as well as detecting the absence or presence of scale component deposition in the concentrated water 14. In FIG. 1, the reference sign 20 denotes a pressure gauge, 21 denotes a flow meter, $L_{11}$ denotes an introduction line for water to be treated, and $L_{12}$ denotes a discharge line for reclaimed water. In the present embodiment, a reverse osmosis membrane device is used as a concentrating device to obtain reclaimed water for description as an example, however the present invention is not limited to this example. The concentrating device is not particularly limited as long as it is a device that concentrates the water to be treated and produces reclaimed water using a filtering membrane.

The water to be treated 11 herein is water that contains calcium sulfate as a scale component, such as mine wastewater. blowdown water of a power plant cooling tower, produced water during drilling of oil or gas, saline water, and industrial waste water, for example.

The water to be treated 11 is pressurized to a predetermined pressure using a booster pump $P_1$ disposed in the introduction line for the water to be treated $L_{11}$, and introduced to a reverse osmosis membrane device 13 including a reverse osmosis (RO) membrane 13a.

At the reverse osmosis membrane device 13 as a salt concentrating step, salts in the water to be treated 11 are concentrated while the water passed through the reverse osmosis membrane 13a is reclaimed as reclaimed water 12 and collected.

From the concentrated water 14, in which the salts are concentrated, calcium sulfate and the like are collected (refer to Embodiment 6 described below).

In the present embodiment, a branched line $L_{14}$ is disposed, branching from a portion of the concentrated water line $L_{13}$ that discharges the concentrated water 14. Also, the scale detection unit 15 is disposed in the branched line $L_{14}$, the scale detection unit 15 including a detection membrane 15a, which further concentrates salts in the branched concentrated water 14, and obtains reclaimed water for detection 16 as well as detects the absence or presence of scale component deposition in the concentrated water 14.

The detection membrane 15a is preferably a reverse osmosis (RO) membrane. Especially, it is more preferable that the detection membrane 15a has the same characteristics as that of the reverse osmosis membrane 13a in the reverse osmosis membrane device 13 disposed in the main line, so that they exhibit the same membrane behavior.

In the present invention, the concentrated water 14 is supplied to the detection membrane 15. Consequently, the scale component can be detected earlier than at the reverse osmosis membrane 13a, because the salt concentration is greater than that of water to be treated 11, which is introduced to the reverse osmosis membrane 13a of the reverse osmosis membrane device 13, and concentration is accelerated.

To verify presence or absence of the scale component, the flow meter for detection 22 is used. The flow meter 22 is disposed in the reclaimed water discharge line for detection $L_{15}$, which discharges the reclaimed water for detection 16.

Specifically, the scale is not deposited when the flow meter for detection 22 indicates the permeation flux (flux) of the reclaimed water for detection 16 to be a predetermined value. The scale deposition on the detection membrane 15a reduces the permeation flux, and by detecting the reduction, it is possible to wash the reverse osmosis membrane 13a of the reverse osmosis membrane device 13 in the main line before the scale deposition on the reverse osmosis membrane 13a occurs.

Using FIG. 2, the relationship between the time of water treatment operation (horizontal axis), the amount of scale deposition on the filtering membrane (left vertical axis) and the permeation flux (right vertical axis) is described below.

Figure 2:
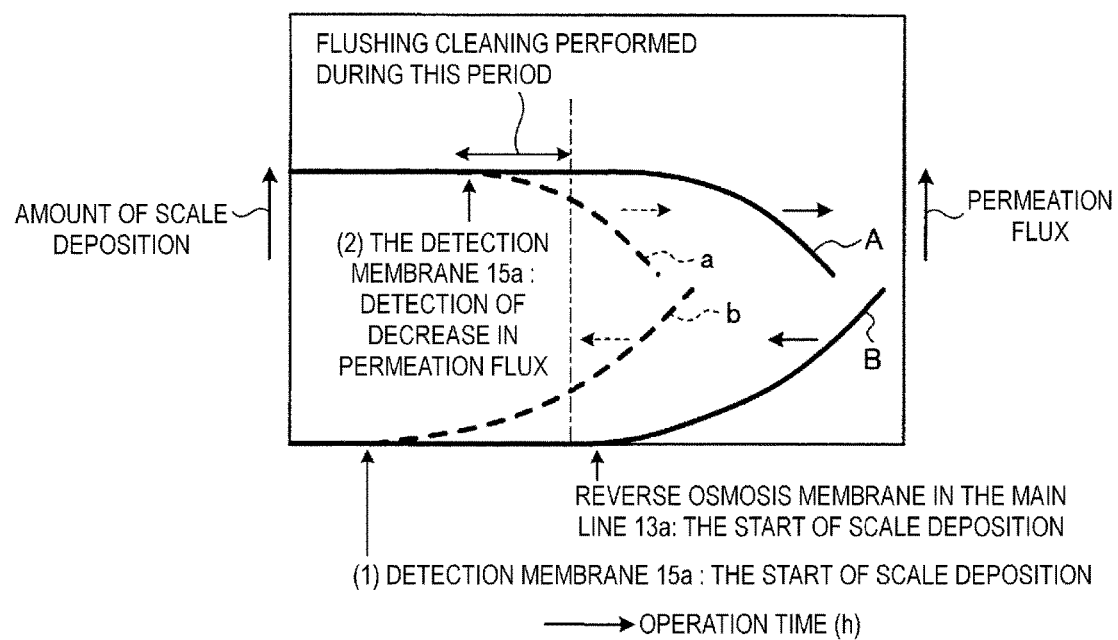
FIG. 2 is a graph illustrating the relationship between the time of water treatment operation (horizontal axis), the amount of scale deposition on the filtering membrane (left vertical axis) and the permeation flux (right vertical axis).

In FIG. 2, the solid line A indicates the permeation flux (flux) of the reclaimed water 12 that permeates through the reverse osmosis membrane 13a of the reverse osmosis membrane device 13 in the main line, and the solid line B indicates the level of the scale deposition on the reverse osmosis membrane 13a of the reverse osmosis membrane device 13 in the main line. In FIG. 2, the dashed line a indicates the permeation flux of the reclaimed water that permeates through the reverse osmosis membrane 15a, and the dashed line b indicates the level of the scale deposition on the reverse osmosis membrane 15a.

As illustrated in FIG. 2, (1) scale component in the concentrated water 14 starts to deposit on the detection membrane 15a as the time of operation passes. Then, (2) the decrease in the permeation flux (flux) at the detection membrane 15a is detected.

When the decrease in the permeation flux is detected at the detection membrane 15a, the flushing cleaning of the reverse osmosis membrane device 13 is performed. In flushing cleaning, a part of the reclaimed water 12 is sent back to the inlet of the reverse osmosis membrane device 13 through the cleaning line $L_{20}$, and the surface of the reverse osmosis membrane 13a of the reverse osmosis membrane device 13 is cleaned.

Unless the flushing cleaning is performed, the amount of the scale deposition on the reverse osmosis membrane 13a increases as illustrated in the solid line B, resulting in the large decrease in the permeation flux as illustrated in the solid line A.

According to the present embodiment, it is possible to detect the signs of the scale deposition in advance because of the condition that facilitates the early scale detection, as the salts are separated at the detection membrane 15a from the concentrated water for detection 17, in which the salt has been rapidly concentrated to yield a high scale component concentration.

As a result, the reverse osmosis membrane 13a of the reverse osmosis membrane device 13 in the main line can be cleaned regularly before the scale deposition, and steady water treatment can be provided.

In the present embodiment, the presence or absence of the scale component is detected by monitoring the flow rate of the reclaimed water for detection 16 using a flow meter for detection 22, but the present invention is not limited to this embodiment. For example, as illustrated in FIG. 3, the presence or absence of the scale deposition may be detected by monitoring the pressure change using a pressure gauge for detection 23 disposed in the branched line $L_{14}$.

Alternatively, the presence or absence of the scale deposition may be detected by monitoring turbidity of the concentrated water for detection 17, using a turbidity meter 24 disposed in the separation line for the concentrated water for detection $L_{16}$, where the concentrated water for detection 17 is separated.

Alternatively, an electric conductivity meter may be disposed, instead of the turbidity meter 24, to monitor the change in electrical conductivity to detect the degree of turbidity.

The detection membrane 15a of the scale detection unit 15 may be discarded every time or may be recycled after regeneration.

According to the present embodiment, by including a scale detection unit 15 including the detection membrane 15a, which is a reverse osmosis membrane, crystal deposition on the reverse osmosis membrane 13a of the reverse osmosis membrane device 13 is detected in advance, when the water to be treated 11 is treated using the reverse osmosis membrane device 13 in the main line.

Embodiment 2

Figure 5:
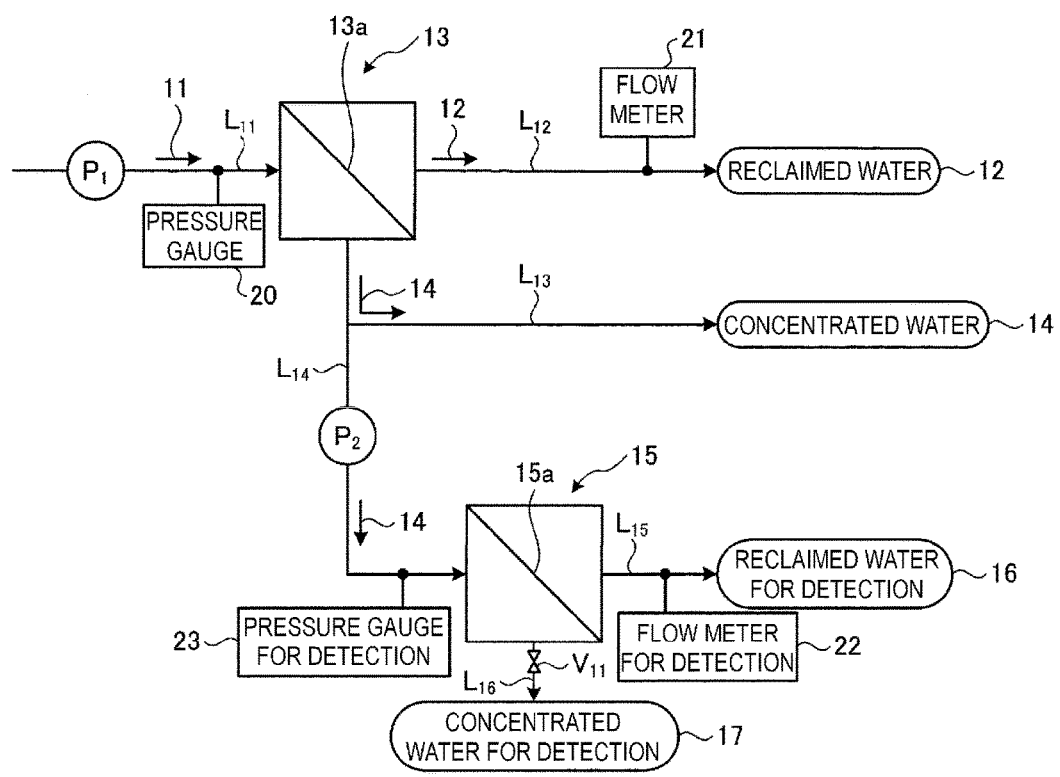
FIG. 5 is a schematic diagram of a scale detection device of a concentrating device according to Embodiment 2.

Next, a cooling tower discharge water reclamation treatment system pertaining to Embodiment 2 will be described. FIG. 5 is a schematic diagram of a scale detection device of the concentrating device.

As illustrated in FIG. 5, the scale detection device of the concentrating device pertaining to the present Embodiment, based on Embodiment 1, further includes a second booster pump P2 disposed in the branched line L14 to increase the water pressure of the branched concentrated water 14 and feed the branched concentrated water 14 to the detection membrane 15a to accelerate the concentration.

By this configuration, the permeation flux, which permeates through the detection membrane 15a, is increased, and the concentration ratio of the concentrated water for detection 17 may be improved. As a result, the scale deposition can be detected at an earlier stage than in Embodiment 1, due to the accelerated scale deposition at the detection membrane 15a.

If the pressure of the water to be treated 11 introduced to the reverse osmosis membrane device 13 is 1 MPa, for example, the pressure of the concentrated water 14 may be increased by 4 MPa approximately, so that the permeation flux, which permeates through the detection membrane 15a, may be increased.

Alternatively, an adjustment valve $V_{11}$ may be disposed in the separation line for the concentrated water for detection $L_{16}$ and the branched water flow rate of the concentrated water for detection 17 may be reduced by throttling the adjustment valve $V_{11}$ to accelerate the concentration.

Embodiment 3

Figure 6:
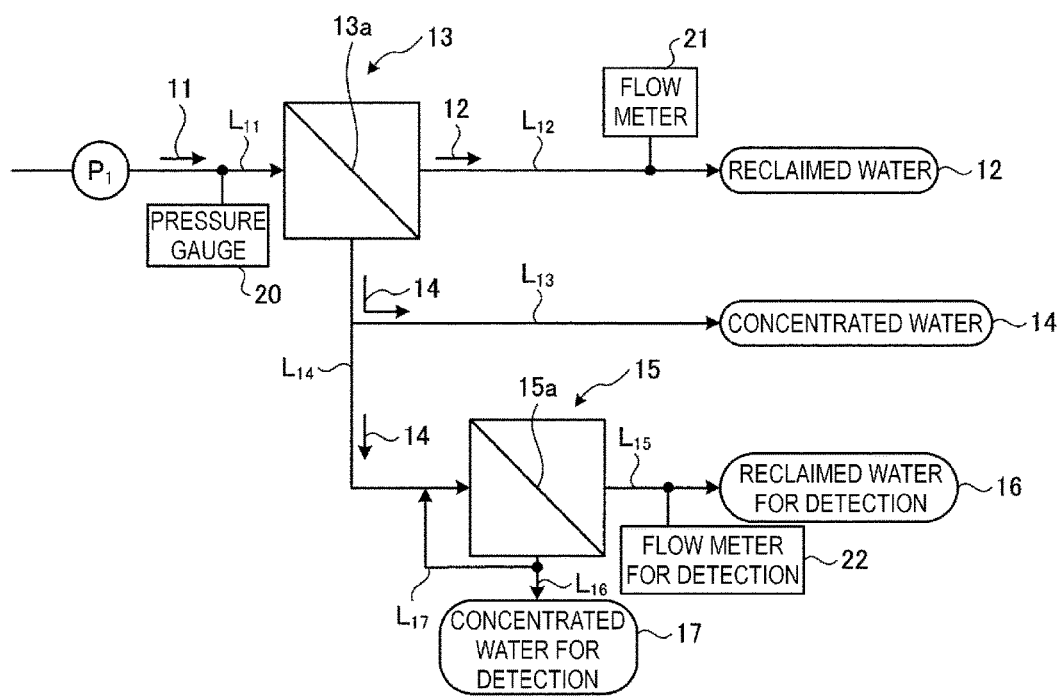
FIG. 6 is a schematic diagram of a scale detection device of a concentrating device according to Embodiment 3.

Next, a cooling tower discharge water reclamation treatment system pertaining to Embodiment 3 will be described. FIG. 6 is a schematic diagram of a scale detection device of the concentrating device.

As illustrated in FIG. 6, the scale detection device of the concentrating device pertaining to the present embodiment, based on Embodiment 1, further includes a circulation line L17, which feeds back a part of the concentrated water for detection 17 from the separation line for the concentrated water for detection L16 to the branched line L14. Thus, the concentrated water for detection 17 can be returned to the inlet-side of the detection membrane 15a again.

In the present embodiment, because the part of the concentrated water for detection 17 is returned to the inlet-side of the detection membrane 15a, the concentrated water 14 with a greater concentration ratio is supplied to the detection membrane 15a compared to the case where the part of the concentrated water for detection 17 is not circulated for reuse as in Embodiment 1. As a result, the concentration ratio of the concentrated water 14 may be greater compared to the case in which the part of the concentrated water for detection 17 is not circulated for reuse. Thus deposition of calcium sulfate can be detected at an earlier stage than in Embodiment 1, due to the accelerated deposition of calcium sulfate.

Embodiment 4

Figure 7:
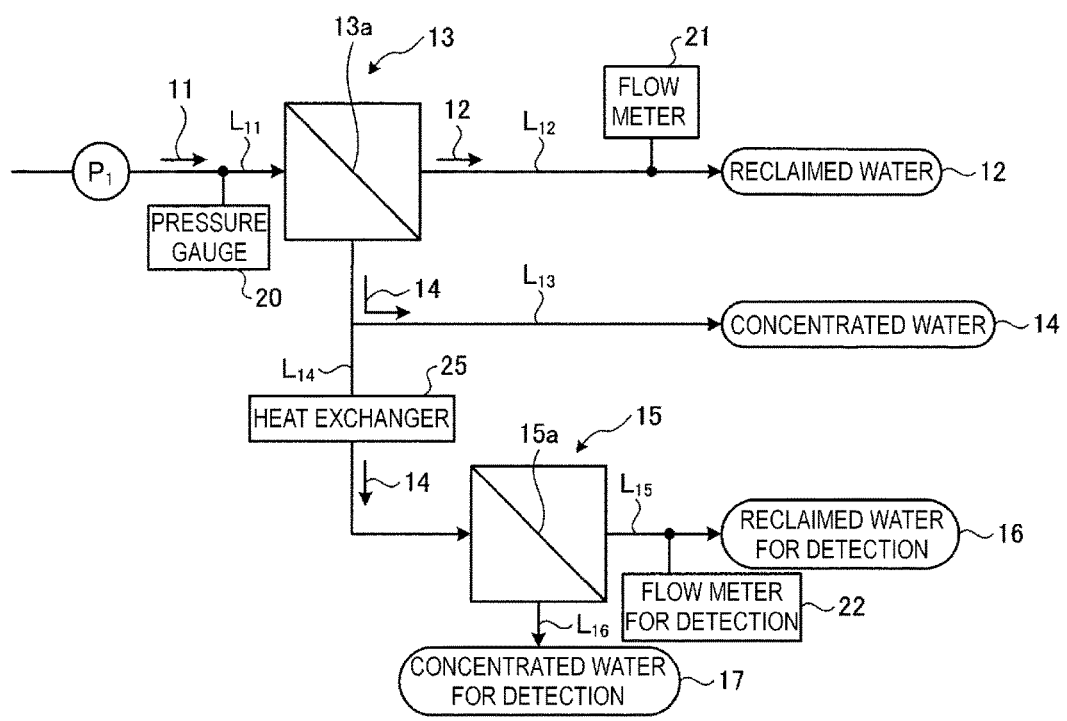
FIG. 7 is a schematic diagram of a scale detection device of a concentrating device according to Embodiment 4.

Next, a cooling tower discharge water reclamation treatment system pertaining to Embodiment 4 will be described. FIG. 7 is a schematic diagram of a scale detection device of the concentrating device.

As illustrated in FIG. 7, the scale detection device of the concentrating device pertaining to the present embodiment, based on Embodiment 1, includes a heat exchange device 25 disposed in a branched line L14 so that the temperature of the concentrated water 14 may be changed.

Figure 8:
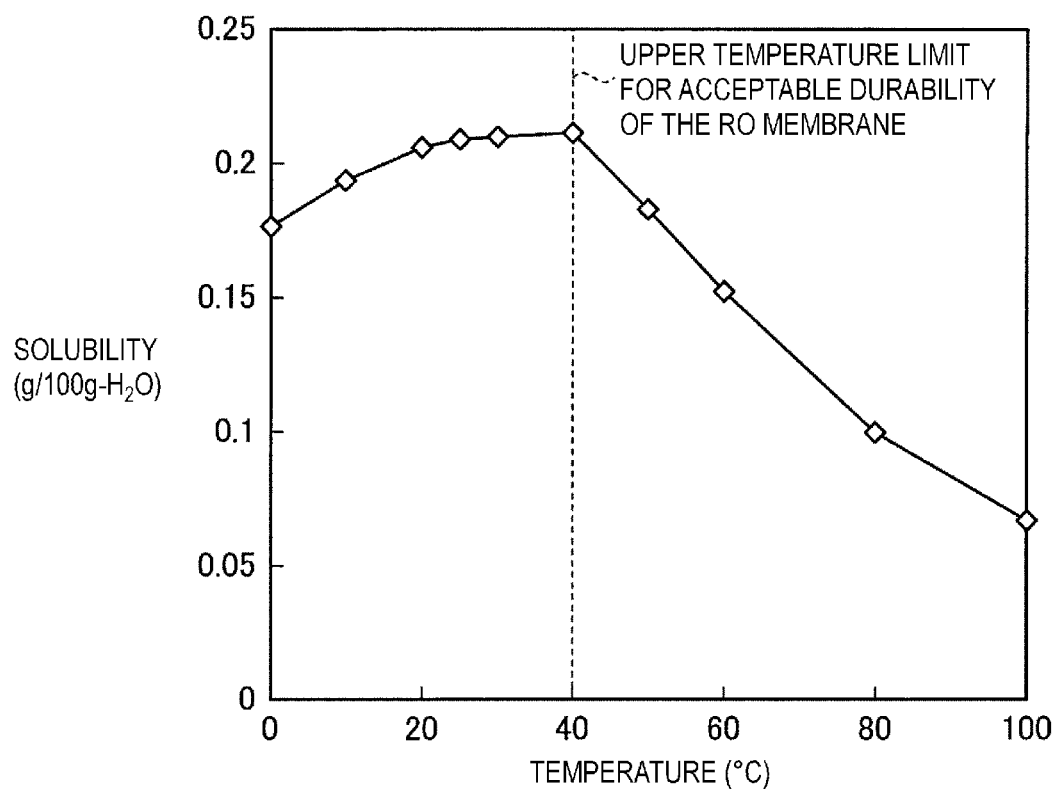
FIG. 8 is a graph illustrating the temperature dependence of calcium sulfate solubility.

FIG. 8 is a graph illustrating the temperature dependence of calcium sulfate solubility.

As illustrated in FIG. 8, the solubility of calcium sulfate is dependent of temperature. Specifically, the solubility is at maximum at approximately 40 degrees C. and the solubility decreases at lower or higher temperatures. Hence, the temperature of the concentrated water 14 is adjusted by a heat exchange device 25 so that the deposition of the calcium sulfate is accelerated.

Specifically, when the concentrated water 14 at the temperature of 30° is separated, for example, the temperature of the concentrated water 14 can be reduced by 10 degrees C. approximately by the heat exchange device 25.

Thus, reduction of the solubility of calcium sulfate due to the temperature change in the concentrated water 14 can accelerate the deposition of calcium sulfate. As a result, deposition of calcium sulfate can be detected at an earlier stage than in Embodiment 1, due to the increased deposition ratio of calcium sulfate in the concentrated water 14 and the accelerated deposition of calcium sulfate compared to the case in which the concentrated water 14 is not cooled.

As illustrated in FIG. 8, the solubility may decrease at higher temperatures compared to the case in which the temperature of the concentrated water 14 is decreased by the heat exchange device 25. However, when a polymer reverse osmosis membrane is used for the detection membrane 15a, the upper temperature limit for acceptable durability of the membrane is at around 40°.

Thus, it is preferable to decrease the temperature when a conventional reverse osmosis membrane with poor thermal durability is used for the detection membrane 15a.

Embodiment 5

Figure 9:
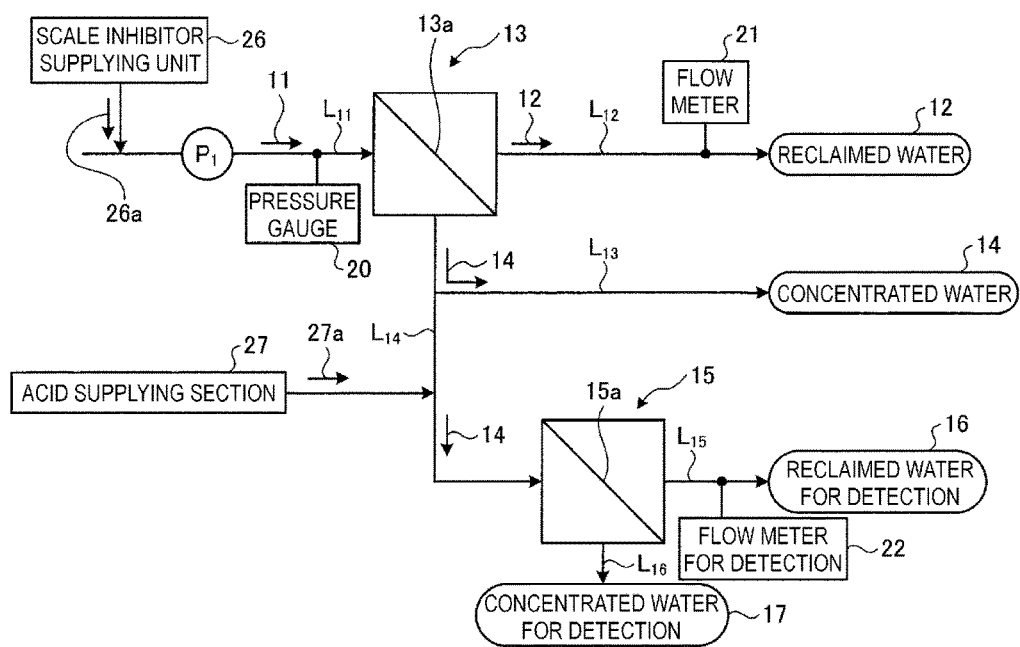
FIG. 9 is a schematic diagram of a scale detection device of a concentrating device according to Embodiment 5.

Next, a cooling tower discharge water reclamation treatment system pertaining to Embodiment 5 will be described. FIG. 9 is a schematic diagram of a scale detection device of the concentrating device.

As illustrated in FIG. 9, the scale detection device of the concentrating device pertaining to the present embodiment, based on Embodiment 1, aims to cancel out the effect of the scale inhibitor by supplying an acid 27a from an acid supplying device 27 to the concentrated water 14 that exits from the reverse osmosis membrane device 13 when the scale inhibitor 26a is supplied to the water to be treated 11 from the scale inhibitor supplying unit 26 to inhibit the scale deposition on the reverse osmosis membrane 13a of the reverse osmosis membrane device 13, before the water to be treated 11 is introduced to the reverse osmosis membrane device 13.

Here, the scale inhibitor 26a is an agent having a function of suppressing the creation of crystal nuclei in the water to be treated 11 and suppressing crystal growth by being adsorbed to the surface of crystal nuclei contained in the water to be treated 11 (seed crystals, deposited small-diameter scales in excess of the saturated concentration, or the like). In addition, the scale inhibitor also has a function of dispersing particles in the water to be treated such as deposited crystals (function of preventing aggregation). Examples of the scale inhibitor 26a include phosphonic acid-based scale inhibitors, polycarboxylic acid-based scale inhibitors, and mixtures thereof. A specific example of the scale inhibitor is FLOCON 260 (trade name, produced by BWA).

As described above, the scale inhibitor 26a is an agent to suppress the creation of scales on the surface of the reverse osmosis membrane 13a in the main line and to prevent clogging of the membrane. By supplying the acid 27a to decrease the pH, the effect of the scale inhibitor can be canceled out.

In the present embodiment, sulfuric acid is supplied as the acid 27a from the acid supplying unit 27 to the concentrated water 14, to maintain the pH thereof at 4 or less. As a result, the effect of the scale inhibitor 26a is canceled out, and the deposition of calcium sulfate is accelerated. Thus, it is possible to detect the scale deposition at the earlier stage than the case in which the acid 27a is not supplied.

Embodiment 6

Figure 10:
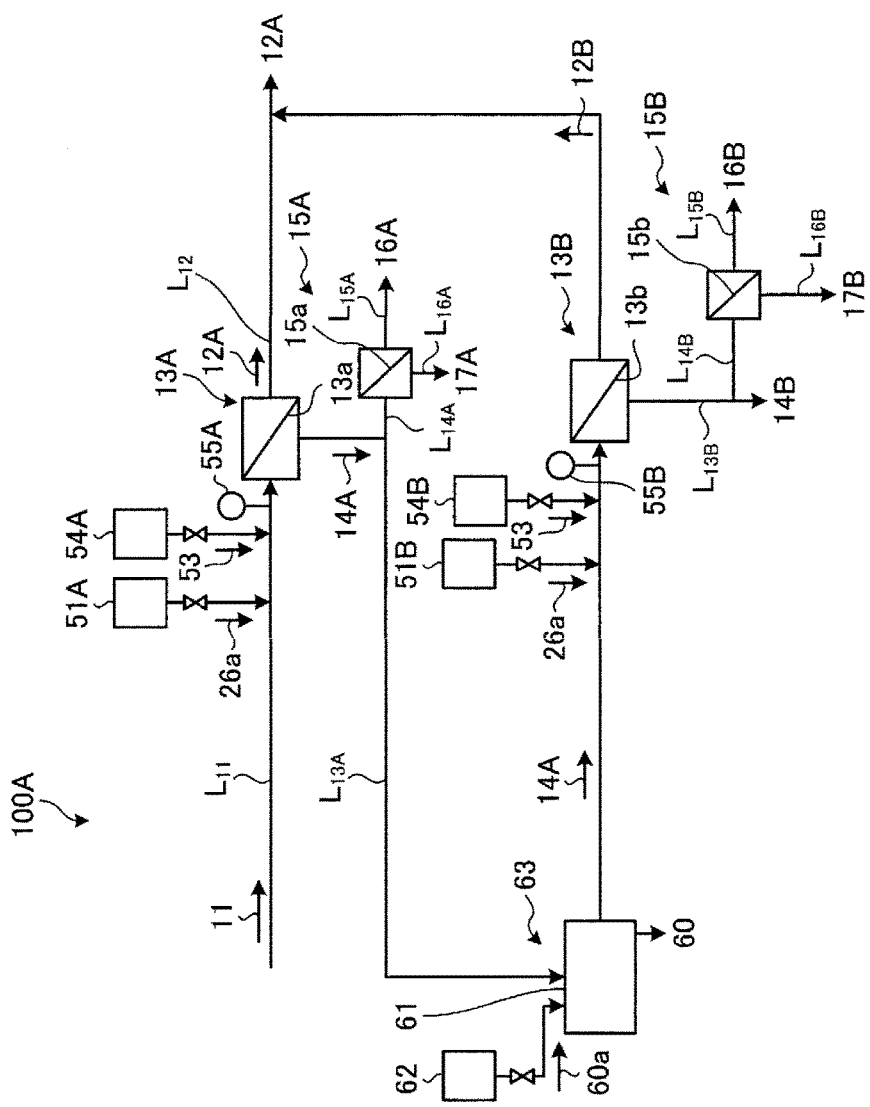
FIG. 10 is a schematic diagram of a configuration of a water reclamation treatment system according to Embodiment 6.

FIG. 10 is a schematic diagram of a water reclamation treatment system of Embodiment 6. As illustrated in FIG. 10, a water reclamation treatment system 100A pertaining to the present embodiment includes: a first scale inhibitor-supplying unit 51A which supplies a scale inhibitor 26a to the water to be treated 11, such as cooling tower discharge water and mine wastewater; a first pH-adjusting unit 54A which adjusts a pH of the water to be treated 11, to which the scale inhibitor 26a has been supplied, using a pH-adjusting agent 53; a first reverse osmosis membrane device 13A which is provided downstream of the first pH-adjusting unit 54A, and removes salts in the water to be treated 11 and separates the water into first reclaimed water 12A and first concentrated water 14A; and a first crystallizing unit 63, which includes a first crystallizing tank 61 which is provided downstream of the first reverse osmosis membrane device 13A and crystallizes calcium sulfate 60 from the first concentrated water 14A, and a seed crystal-supplying unit 62 which supplies seed crystals of calcium sulfate (calcium sulfate seeds) 60a to the first crystallizing tank 61. In the FIG. 10, the reference sign $L_{15A}$ denotes the discharge line for the reclaimed water for detection, which discharges the first reclaimed water for detection 16A; $L_{16A}$ denotes the separation line for the concentrated water for detection, which separates the first concentrated water for detection 17A; $L_{15B}$ denotes the discharge line for the reclaimed water for detection, which discharges the second reclaimed water for detection; and $L_{16B}$ denotes the separation line for the concentrated water for detection, which separates the second concentrated water for detection 17B.

In the present embodiment, the scale inhibitor 26a is supplied from the first scale inhibitor-supplying unit 51A to the water to be treated 11. Subsequently, the pH of the water to be treated 11 supplied to the first reverse osmosis membrane device 13A is adjusted to not less than 10, preferably not less than 10.5, and more preferably not less than 11. The pH gauge 55A measures the pH of the water to be treated 11 at the inlet of the first reverse osmosis membrane device 13A. The controller that is not illustrated in the figure adjusts the degree of opening of the valve and inputs alkali from the tank of the first pH-adjusting unit 54A into the water to be treated 11 such that the value measured by the pH gauge 55A reaches a predetermined pH control value.

In the first reverse osmosis membrane device 13A, the pH-adjusted water to be treated 11 is subjected to desalination treatment. The water passed through the reverse osmosis membrane 13a is recovered as a first reclaimed water 12A. The ions and the scale inhibitor 26a contained in the water to be treated 11 cannot pass through the reverse osmosis membrane 13a. Therefore, in the unpermeated side of the reverse osmosis membrane 13a, a first concentrated water 14A having a high ion concentration is present.

By means of the first desalinating step, silica is contained in the first concentrated water 14A in a dissolved state in the water to be treated. Even if calcium sulfate and calcium carbonate in the first concentrated water 14A are concentrated at their respective saturation concentrations or higher, scale generation is suppressed by the calcium scale inhibitor used as the scale inhibitor 26a.

When $Mg^{2+}$ is contained in the water to be treated 11, the $Mg^{2+}$ concentration contained in the first concentrated water 14A is increased by means of the first desalinating step. However, generation of magnesium hydroxide scale is suppressed by magnesium scale inhibitor used as the scale inhibitor 26a. The first concentrated water 14A is fed toward the crystallizing tank 61.

The first concentrated water 14A discharged from the first reverse osmosis membrane device 13A is stored in the crystallizing tank 61. The calcium sulfate seed crystals 60a from the seed crystal-supplying unit 62 is added to the first concentrated water 14A in the crystallizing tank 61.

Since the pH of the first concentrated water 14A from the first reverse osmosis membrane device 13A is not less than 10, calcium sulfate 60 is in the dissolved state in the presence of calcium scale inhibitor. However, when enough seed crystals 60a are present, the calcium sulfate 60 crystallizes with the seed crystals 60a as nuclei even if scale inhibitor is present.

Therefore, calcium sulfate 60, which has been grown from the seed crystals 60a to a large diameter (for example, particle size not less than 10 μm) precipitates on the bottom of the crystallizing tank 61. The precipitated calcium sulfate 60 is discharged from the bottom of the crystallizing tank 61.

The first concentrated water 14A, from which calcium sulfate 60 was separated, is fed to the downstream second reverse osmosis membrane device 13B. Water that passes through the downstream second reverse osmosis membrane device 13B is recovered as the second reclaimed water 12B. The second concentrated water 14B of the second reverse osmosis membrane device 13A is discharged outside the system.

By disposing the second reverse osmosis membrane device 13B, it becomes possible to further recover the second reclaimed water 12B from the first concentrated water 14A, from which calcium sulfate 60 has been removed, after being treated by the first reverse osmosis membrane device 13A. Thus, the amount of reclaimed water 12 is the total of the first reclaimed water 12A and the second reclaimed water 12B, and the water recovery rate of the reclaimed water is improved. Furthermore, to prevent scale deposition, scale inhibitor 26a is supplied from a second scale inhibitor-supplying unit 51B, and pH adjustment in this case is controlled by a second pH-adjusting unit 54B. The control method is similar to that used for the first scale inhibitor-supplying unit 51A and the first pH-adjusting unit 54A.

In the cooling tower discharge water reclamation treatment systems 100A of the present embodiment, the ions are concentrated in the first reverse osmosis membrane device 13A, while calcium sulfate 60 is removed in the crystallizing tank 61. For this reason, the first concentrated water 14A that flows into the downstream second reverse osmosis membrane device 13B has a lower ion concentration than that of before treatment. Thus, the osmotic pressure in the second reverse osmosis membrane device 13B located downstream becomes lower, and the required power is reduced.

A water reclamation treatment system 100A pertaining to the present embodiment includes: a second scale inhibitor-supplying unit 51B which supplies a scale inhibitor 26a to the first concentrated water 14A from which calcium sulfate has been separated; a second pH-adjusting unit 54B which adjusts a pH of the first concentrated water 14A, to which the scale inhibitor 26a has been supplied, using a pH-adjusting agent 53; and a second reverse osmosis membrane device 13A which is provided downstream of the pH-adjusting unit 54B and further removes salts in the first concentrated water 14A and separates the water into second reclaimed water 12B and second concentrated water 14B.

This system includes: the first scale detection unit 15A which includes a branched line $L_{14A}$ branched from the separation line $L_{13A}$ of the first concentrated water 14A from the first reverse osmosis membrane device 13A and the detection membrane 15a; and the second scale detection unit 15B which includes a branched line $L_{14B}$ branched from the separation line $L_{13B}$ of the second concentrated water 14B from the second reverse osmosis membrane device 13B and the detection membrane 15b, separately. Thus, scale deposition in the first reverse osmosis membrane device 13A and the second reverse osmosis membrane device 13B can be detected in advance, and the stable water reclamation treatment is provided continuously.

At the first scale detection unit 15A, the first concentrated water 14A is separated into the first reclaimed water for detection 16A and the first concentrated water for detection 17A by the detection membrane 15a, so that the absence or presence of scale component deposition in the first concentrated water 14A can be detected. Likewise, at the second scale detection unit 15B, the second concentrated water 14B is separated into the second reclaimed water for detection 16B and the second concentrated water for detection 17B by the detection membrane 15b, so that the absence or presence of scale component deposition in the second concentrated water 14B can be detected.

The first scale detection unit 15A and the second scale detection unit 15B can detect the crystal deposition on the first reverse osmosis membrane 13a and the second reverse osmosis membrane 13b in advance by detecting the crystal deposition on the first reverse osmosis membrane 13a in the first reverse osmosis membrane device 13A and on the second reverse osmosis membrane 13b of the second reverse osmosis membrane device 13B in advance, respectively, using the configurations of the Embodiments 1 to 5, described above.

Thereby, when calcium sulfate, which is the scale component, is present in the water to be treated 11 at an abnormally high concentration, it is possible to perform flushing cleaning to avoid troubles caused by the scale deposition on the reverse osmosis membrane in the main line, upon detecting the signs of scale deposition on the first and the second reverse osmosis membrane, 13a and 13b, of the first and the second reverse osmosis membrane device, 13A and 13B in the main line.

Figure 11:
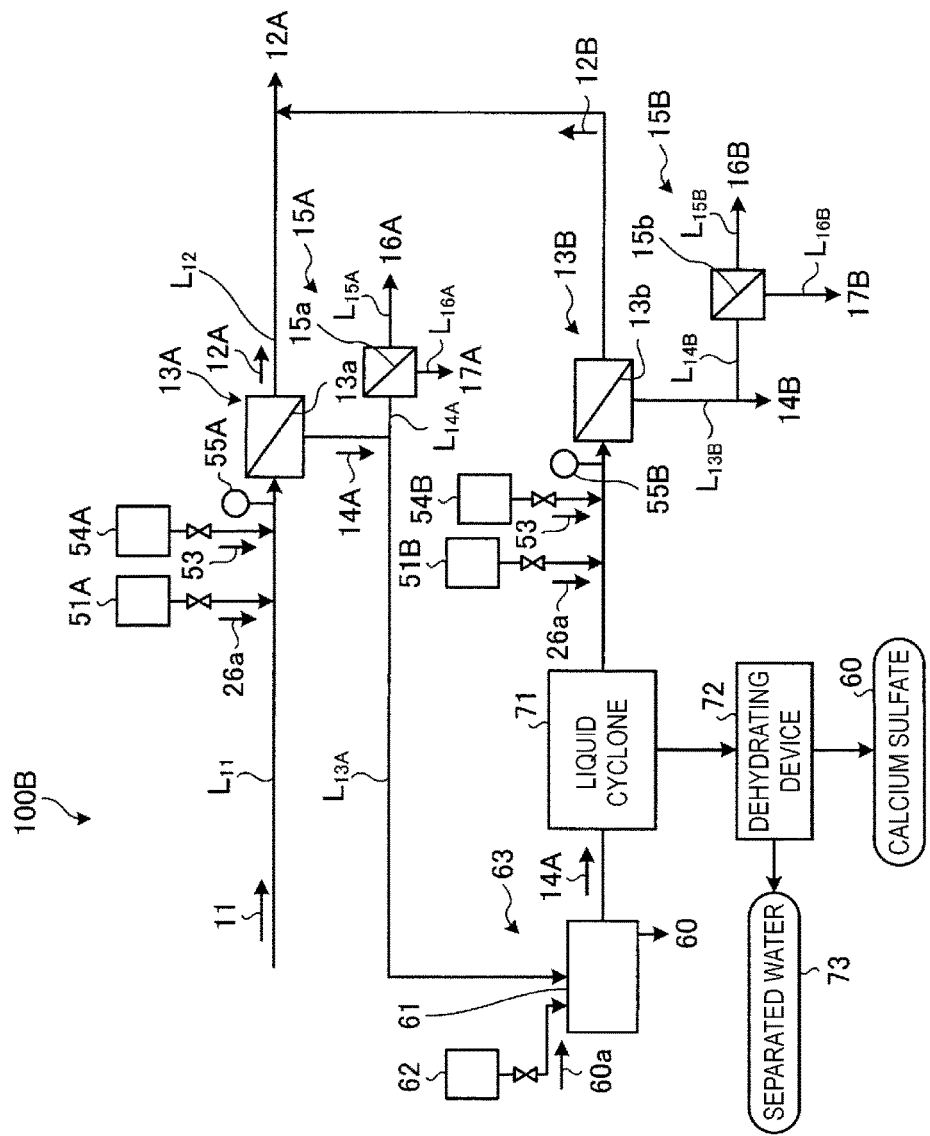
FIG. 11 is a schematic diagram of a configuration of another water reclamation treatment system according to Embodiment 6.

Also, as in the cooling tower discharge water reclamation treatment system 100B illustrated in FIG. 11, a liquid cyclone 71 as a calcium sulfate separating means may be provided downstream of the crystallizing tank 61, such that calcium sulfate 60 and supernatant water are separated in the liquid cyclone 71, and the separated calcium sulfate 60 is dehydrated by removing a separated liquid 73 using a dehydrating device 72, thereby reliably separating the calcium sulfate 60.

REFERENCE SIGNS LIST

11 Water to be treated
12 Reclaimed water
13a Reverse osmosis membrane
13 Reverse osmosis membrane device
14 Concentrated water
15a Detection membrane
15 Scale detection unit
16 Reclaimed water for detection
17 Concentrated water for detection

The invention claimed is:

1. A scale detection device of a concentrating device, the scale detection device comprising:
 a concentrating device including a filtering membrane concentrating salt in a water to be treated containing at least calcium sulfate to obtain reclaimed water;
 a scale detection unit disposed in a branched line branched from a concentrated water line discharging concentrated water having a high concentration of salt, the scale detection unit further concentrating salt in the concentrated water to obtain reclaimed water for detection, and including a detection membrane detecting the absence or presence of scale component deposition in the concentrated water; and
 a booster pump that is disposed in the branched line to increase a pressure of the concentrated water supplied to the detection membrane in the scale detection unit.

2. The scale detection device of a concentrating device according to claim 1, further comprising
 a valve that reduces an amount of the concentrated water for detection separated at the detection membrane.

3. A scale detection device of a concentrating device, the scale detection device comprising:
 a concentrating device including a filtering membrane concentrating salt in a water to be treated containing at least calcium sulfate to obtain reclaimed water;
 a scale detection unit disposed in a branched line branched from a concentrated water line discharging concentrated water having a high concentration of salt, the scale detection unit further concentrating salt in the concentrated water to obtain reclaimed water for detection, and including a detection membrane detecting the absence or presence of scale component deposition in the concentrated water; and a circulation line that is disposed from a separation line for concentrated water for detection discharged from the scale detection to the branched line and that feeds a part of the concentrated water for detection separated at the detection membrane back to an inlet of the detection membrane.

4. A scale detection device of a concentrating device, the scale detection device comprising:
   a concentrating device including a filtering membrane concentrating salt in a water to be treated containing at least calcium sulfate to obtain reclaimed water;
   a scale detection unit disposed in a branched line branched from a concentrated water line discharging concentrated water having a high concentration of salt, the scale detection unit further concentrating salt in the concentrated water to obtain reclaimed water for detection, and including a detection membrane detecting the absence or presence of scale component deposition in the concentrated water; and
   a heat exchange device that is disposed in the branched line and that performs heat exchange on the concentrated water supplied to the scale detection unit.

5. The scale detection device of a concentrating device according to claim 1, wherein
   an effect of a scale inhibitor is canceled out by supplying an acid to the concentrated water exiting from the concentrating device,
   when scale deposition on a filtering membrane of the concentrating device is prevented by supplying the scale inhibitor to the water to be treated before introduction to the concentrating device.

6. The scale detection device of a concentrating device according to claim 1, wherein
   the scale component is calcium sulfate and the detection membrane is a reverse osmosis membrane.

7. The scale detection device of a concentrating device according to claim 1, wherein
   the water to be treated is any one of mine wastewater, blowdown water of a power plant cooling tower, produced water during drilling of oil or gas, saline water, and industrial waste water.

8. A scale detection method of a concentrating device using the scale detection device of a concentration device of claim 1, the scale detection method comprising:
   a salt concentrating step of concentrating salt in water to be treated containing at least calcium sulfate by a filter membrane and separating the water to be treated into reclaimed water and concentrated water;
   and a scale detection step of obtaining reclaimed water for detection by further concentrating salt in a portion of separated and salt-concentrated water, and detecting the absence or presence of scale component deposition in the concentrated water.

9. The scale detection method of a concentrating device according to claim 8, wherein
   a pressure of the concentrated water supplied to a detection membrane in the scale detection step is increased to improve a concentration ratio.

10. The scale detection method of a concentrating device according to claim 8, wherein
    an amount of concentrated water for detection separated at the detection membrane is reduced to improve the concentration ratio.

11. The scale detection method of a concentrating device according to claim 8, wherein the concentrated water for detection separated at the detection membrane is sent back to an inlet of the detection membrane to improve the concentration ratio.

12. The scale detection method of a concentrating device according to claim 8, wherein
    the concentrated water supplied to the scale detection unit is subjected to heat exchange to increase the amount of scale deposition.

13. The scale detection method of a concentrating device according to claim 8, wherein
    an effect of a scale inhibitor is canceled out by supplying an acid to the concentrated water exiting from the concentrating device,
    when scale deposition on a filtering membrane of the concentrating device is prevented by supplying the scale inhibitor to the water to be treated before introduction to the concentrating device.

14. A water reclamation treatment system comprising:
    a first scale inhibitor-supplying unit supplying a scale inhibitor to water to be treated containing a calcium sulfate component;
    a first pH-adjusting unit adjusting a pH of discharged water to which the scale inhibitor has been supplied using a pH-adjusting agent;
    the scale detection device of a concentrating device according to claim 1 provided downstream of the first pH-adjusting unit comprising:
    a first concentrating device, the first concentrating device concentrating salt in the water to be treated and separating the water to be treated into first reclaimed water and first concentrated water as the concentrating device according to claim 1;
    a first scale detection unit provided in a first branch line branched from a first concentrated water line discharging the first concentrated water with salt therein concentrated at the first concentrating device, the first scale detection unit obtaining a first reclaimed water for detection by further concentrating salt from the first concentrated water and including a first detecting membrane detecting the absence or presence of scale component deposition in the concentrated water as the scale detection unit according to claim 1; and
    a crystallizing tank provided downstream of the first concentrating device, the crystallizing tank crystallizing calcium sulfate from the first concentrated water.

15. The water reclamation treatment system according to claim 14, further comprising:
    a second scale inhibitor-supplying unit supplying a scale inhibitor to the first concentrated water, calcium sulfate having been separated from the first concentrated water;
    a second pH-adjusting unit adjusting a pH of the first concentrated water, the scale inhibitor having been supplied to the first concentrated water;
    the scale detection device of a concentrating device according to claim 1 provided downstream of the first pH-adjusting unit comprising:
    a second concentrating device, the second concentrating device concentrating salt in the first concentrated water and separating the first concentrated water into second reclaimed water and second concentrated water as the concentrating device according to claim 1; and
    a second scale detection unit provided in a second branch line branched from a second concentrated water line discharging the second concentrated water with salt therein concentrated at the second concentrating device, the second scale detection unit obtaining a second reclaimed water for detection by further concentrating salt from the second concentrated water and including a second detecting membrane detecting the absence or presence of scale component deposition in the second concentrated water as the scale detection unit according to claim 1.

16. The scale detection device of a concentrating device according to claim 2, wherein
an effect of a scale inhibitor is canceled out by supplying an acid to the concentrated water exiting from the concentrating device,
when scale deposition on a filtering membrane of the concentrating device is prevented by supplying the scale inhibitor to the water to be treated before introduction to the concentrating device.

17. The scale detection device of a concentrating device according to claim 2, wherein
the scale component is calcium sulfate and the detection membrane is a reverse osmosis membrane.

18. The scale detection device of a concentrating device according to claim 2, wherein
the water to be treated is any one of mine wastewater, blowdown water of a power plant cooling tower, produced water during drilling of oil or gas, saline water, and industrial waste water.

19. The scale detection device of a concentrating device according to claim 3, wherein
an effect of a scale inhibitor is canceled out by supplying an acid to the concentrated water exiting from the concentrating device,
when scale deposition on a filtering membrane of the concentrating device is prevented by supplying the scale inhibitor to the water to be treated before introduction to the concentrating device.

20. The scale detection device of a concentrating device according to claim 3, wherein
the scale component is calcium sulfate and the detection membrane is a reverse osmosis membrane.

21. The scale detection device of a concentrating device according to claim 3, wherein
the water to be treated is any one of mine wastewater, blowdown water of a power plant cooling tower, produced water during drilling of oil or gas, saline water, and industrial waste water.

22. The scale detection device of a concentrating device according to claim 4, wherein
an effect of a scale inhibitor is canceled out by supplying an acid to the concentrated water exiting from the concentrating device,
when scale deposition on a filtering membrane of the concentrating device is prevented by supplying the scale inhibitor to the water to be treated before introduction to the concentrating device.

23. The scale detection device of a concentrating device according to claim 4, wherein
the scale component is calcium sulfate and the detection membrane is a reverse osmosis membrane.

24. The scale detection device of a concentrating device according to claim 4, wherein
the water to be treated is any one of mine wastewater, blowdown water of a power plant cooling tower, produced water during drilling of oil or gas, saline water, and industrial waste water.

\* \* \* \* \*